April 28, 1936.   J. P. CALLAHAN   2,039,212
SIDE WINDSHIELD
Filed April 5, 1935
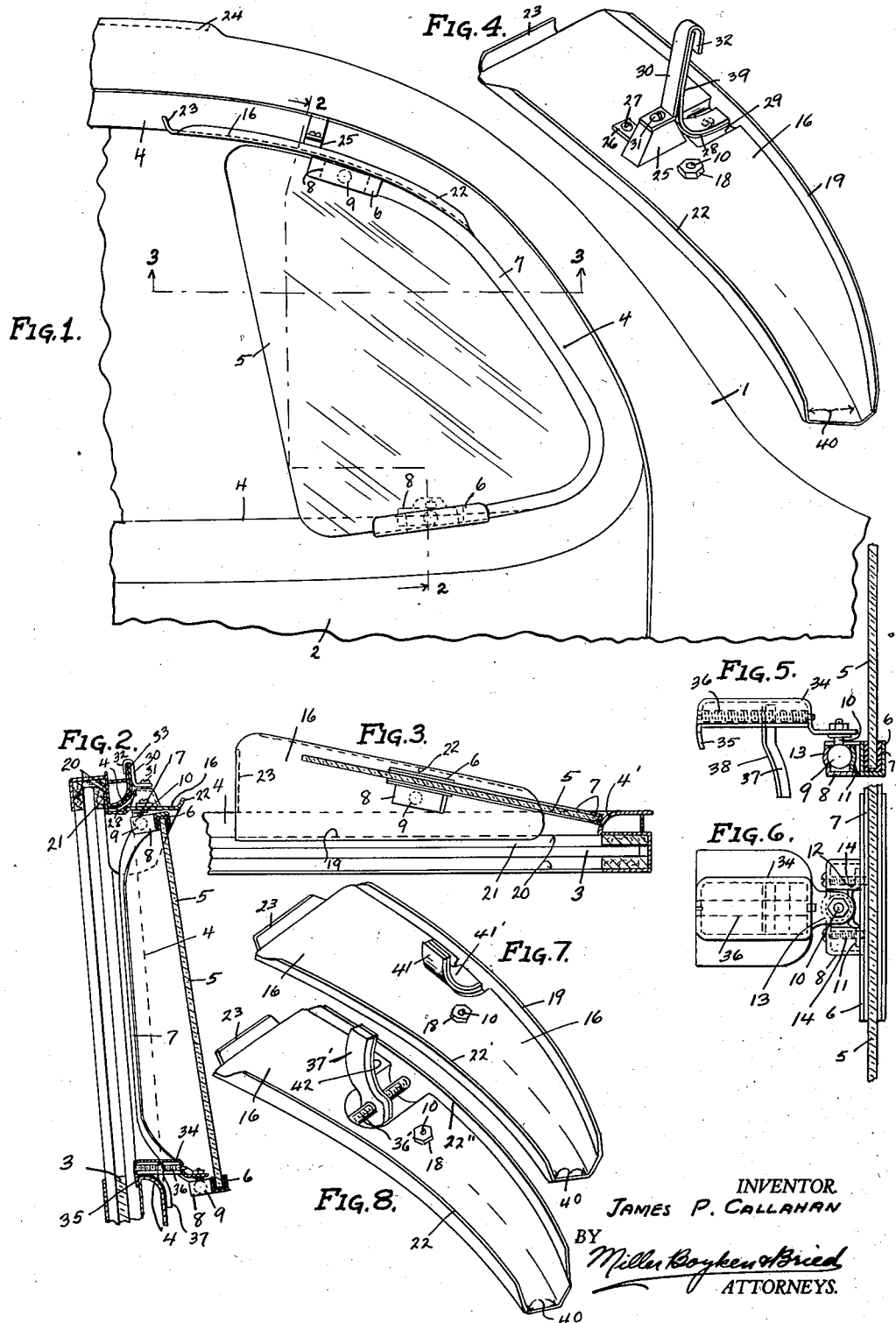
INVENTOR.
JAMES P. CALLAHAN
BY
Miller Boyken & Bried
ATTORNEYS.

Patented Apr. 28, 1936

2,039,212

UNITED STATES PATENT OFFICE 2,039,212

SIDE WINDSHIELD

James P. Callahan, San Francisco, Calif.

Application April 5, 1935, Serial No. 14,773

14 Claims. (Cl. 296—84)

This invention relates to side windshields as used on the doors and side windows of closed body automobiles, and the object of the invention is to provide such construction for mounting such side windshields, hereinafter referred to as "side wings", which will insure against ingress of wind, rain, sleet and the like to the space between the side wing and the door window and which will permit pivoting the side wing. Other objects and advantages will appear in the specification and drawing.

In the drawing, Fig. 1 is an elevational view of one of my improved side wings as it appears from the outer right-hand side of the automobile when in place on the door of the automobile.

Fig. 2 is a sectional view as seen from the line 2—2 of Fig. 1.

Fig. 3 is a sectional view as seen from the line 3—3 of Fig. 1.

Fig. 4 is an enlarged perspective view of the upper supporting plate to which the side wing is pivoted at its upper end.

Fig. 5 is an enlarged elevational view of the lower supporting bracket to which the side wing is pivoted at its lower end, part of the bracket and glass side wing being in section.

Fig. 6 is a plan view of the bracket of Fig. 5, the glass side wing being in section.

Fig. 7 is a modified form of upper supporting plate shown in perspective.

Fig. 8 is another form of upper supporting plate shown in perspective.

Heretofore side wings have been provided with upper supporting plates that move with the side wings, and also with plates that have been screwed to the automobile doors or bodies, with side wings pivoted thereto top and bottom. Of the former type, my patent No. 1,980,976 is a fair example, in which the plate is adapted to follow the curvature of the door window opening at its forward end. In this application I show an upper plate adapted to extend transversely across the portion of the reveal of the door window opening to the outer side of a sliding glass in said door, and to project to the outside of the window opening at the outer side of the door, which plate follows the outline defining the window opening along its upper edge, forward upper corner and slightly along the forward edge. This plate has upstanding inner and outer opposite edges, the inner edge adapted to fit against the inner side of that portion of the door adjacent the window opening that lies to the outer side of the sliding glass of the window, and the outer upstanding edge of the plate spaced from said inner upstanding edge and from the outer side of the automobile door when in position, with the outer upstanding edge extending divergently relative to the inner upstanding edge from the forward end of the plate rearwardly. Thus a sort of channel is formed to the outer side of the door between the reveal defining the window opening and the outer upstanding edge of the plate to drain the rain to the outer side of the automobile door and down the outer lateral side of the side wing at its forward edge, and to also carry the rain water or the like over the top of the plate rearwardly over the window opening instead of admitting the falling rain to the space between the door window opening and the side wing. At the same time this plate mounts the side wing and permits pivotal movement thereof relative thereto and in actual practice, in driving, practically no rain will enter the door window opening when the sliding glass is down. Also in my device the side wing including the upper plate and lower bracket are adapted to clamp to the door without requiring holes to be drilled, etc. None of the patents in the prior art, so far as I am aware, are adapted to function in the manner described.

In the drawing the automobile body is indicated at 1 and a door 2 provided with a window opening therein fitted with sliding glass 3. In the drawing I have shown the reveal of the window as being substantially a quarter-round in cross section as at 4, although it may vary somewhat, though in practically every instance it is rounded on the edge adjacent the outer side of the door.

My improved side wing comprises a generally vertically extending glass sheet 5 formed at its upper and forward edges to conform to the outline of the reveal of the window opening as indicated in Fig. 1, and the lower edge also preferably conforms to the outline of the lower reveal generally but, as shown in the drawing, the lower edge of the glass sheet may be slightly inclined downwardly to insure greater efficiency in deflecting the wind, rain and the like. Embracing the upper and lower edges of the sheet 5 respectively are elongated U-shaped channel members 6. A soft, continuous strip of soft rubber 7, U-shaped in cross section, embraces the upper forward and lower edges of the sheet 5 extending at its opposite ends between the channel members 6 and the sheet so as to secure the rubber strip in place and at the same time to frictionally hold the members 6 in place and to act as a cushion between said members and the glass, all as clearly shown in my Patent No. 1,980,976 of November 20, 1934.

The glass sheet is adapted to be generally vertically positioned to extend across the forward portion of the window opening with the rubber strip engaging the reveal of the window along its forward edge and lower curved corners, and is disposed in a plane extending divergently from its forward edge rearwardly relative to the outer side of the door. In modern automobiles the side of the door is slightly inclined, as indicated in Fig. 2 of the drawing, and the glass sheet of my side wing is preferably disposed with a still steeper incline, although it may have the same inclination.

Secured respectively to each of members 6 on the side thereof adjacent the door is a bearing box 8. Each box is formed with a socket, best seen in Figs. 5, 6, for pivotally mounting a ball 9 having a bolt 10 extending from a side thereof through an opening in a side of the box for securing to attaching devices adapted to engage over the upper and lower reveals of the window for supporting the side wing on the automobile.

The bearing box on the upper and lower channel members are identical in structure. While the bolt 10 of each ball secured in each box is shown as extending in a direction toward the other, it is thought obvious that they may both project downwardly, if desired, in which case the height of the side wing is shortened to bring the lower edge substantially within the projected area of the window opening. These bearing boxes are quite similar to those shown in my Patent 1,940,995 of December 26, 1933, each having a plate 11 formed with a central spherical depression. This plate is supported against the inner side of channel member 6 by legs 12 at its ends so as to permit resiliency of the portion carrying the depression to enable variation of the frictional resistance to the ball 9 when clamped in the depression. A rectangular box-like housing open on one side and with the bottom 13, or end opposite the open side, formed with a spherical depression similar to depression in plate 11, embraces plate 11 with the ball 9 seated in the depression between the wall or bottom 13 and the plate 11 and the bolt 10 extending through the side of the housing adjacent the bottom. Screws 14 extend through the bottom 13 and plate 11 and are threaded at their outer ends in the side of member 6 on opposite sides of the ball to secure the parts to the member 6 and to enable tightening of the ball in the socket thus formed to increase or lessen the friction on the ball as desired, or to take up for any wear. The bolt projecting from the box-like structure is, of course, free to move in any lateral direction due to the side of the box being cut away as indicated in Fig. 6.

Referring now to the upper member 6 and its ball and socket members as described, the bolt 10 of ball 9 in the upper assembly extends upwardly and through an opening about centrally positioned in an elongated plate 16. A collar 17 on the bolt seats against the under side of said plate and a nut 18 is threaded on the outer end of the bolt engaging the upper side of the plate to securely fasten the plate and bolt together against relative movement, the collar also functioning to properly space the plate relative to the upper end of the glass sheet 5 and top of the channel member 6 as well as from the box-like bearing assembly, so as to enable considerable movement of the plate relative to the other parts of the side wing at the upper end thereof in several directions.

As already stated, the plate 16 is elongated, and it is bowed or formed longitudinally to conform to the linear outline of the window reveal along the upper forward corner of the window opening and a short distance along the upper and forward run of the reveal. The plate is formed with an upstanding edge 19 along one of its longitudinally extending edges, which edge is adapted to seat in the groove 20 in the door in which the sliding door glass 3 is adapted to slide and against the inner side of the groove between felt strip 21 and the door in a manner to not interfere in any way with the sliding of the door glass, and since the plate 20 is relatively thin it is thought obvious that there is no noticeable obstruction to the free sliding of the door glass. With the upstanding edge in place as described, the plate 16 proper extends transversely across the reveal of that portion of the window opening that lies to the outer side of the sliding door glass and to the outside of the door. The ball 9, of course, is thus brought to the outside of the door so as to support the glass sheet 5 in position to the outside of the window opening.

The edge 22 of plate 16 opposite the upstanding edge 19 is turned upwardly the same as edge 19 and extends divergently relative to edge 19 rearwardly from the forward end of the plate 16. This divergence is designed to be approximately the same degree as the normal divergence of the glass sheet 5 when the forward rubber covered edge of the glass sheet is seated against the forward reveal of the window opening. The glass sheet 5, however, spaced toward the side of the door 2 from the edge 22 of the plate 16.

The plate 16 at its forward end is slightly wider than the thickness of that portion of the forward reveal of the window opening to the outer side of the sliding glass, hence the upstanding edge 22 coacts with said portion of the reveal and with the upper reveal to form a channel to the outer side of the door for guiding water striking the plate 22 downwardly alongside the forward reveal to the outer side of the door and I also strike up the rear edge of plate 16 as at 23 in that portion between the reveal and upturned edge 22 for the purpose of deflecting rain, sleet and the like upwardly and into the air stream of the automobile when the automobile is moving forward, thus keeping the side of the automobile and windows clear of rain, etc.

It is also to be noted that the plate 16 extends a distance rearward of the rear edge of the glass sheet 5 to past a line even with the forward end of the top 24 of the car body. This is to not only insure proper deflection of water striking the plate away from the window, but is to catch water that overflows from the depression formed in the top of the automobile, which depression is indicated in dotted line in Fig. 1. At the present time, where there is no drip molding, this water passes over the side of the automobile and against the window or into the window opening due to the incline of the door as seen in Fig. 2. By extending the plate 20 as indicated, this water is caught by the plate 16 and drained away alongside the forward edge of the side wing to the outer side thereof.

In order to secure plate 16 rigidly against movement relative to the window opening, I provide on its upper side to the outer side of the upper reveal of the door an upstanding box-like member 25 open on the bottom and closed on top, one side thereof being formed with a lip 26 adapted to lie against plate 16 and to be secured thereto by screw 27 and the adjacent side of the box is formed with a lip 28 that lies in a depression 29 formed in the upper side of plate 16 in that portion adapted to lie directly below the reveal of the window when the plate is in position on the automobile. The lip 28 and the side of the box from which it is extended are curved to conform to the cross sectional curvature of the window reveal along its outer edge. A strap 30 of sheet metal is bent at one end to extend over the upper side of the box and is secured thereto by a screw 31 that extends through the top of the box and thereinto, and the opposite end of the strap is in the form of a downwardly opening hook 32 adapted to hook over the upstanding edge 33 of the upper edge of the door. By this construction, there is considerable adjustment permissible by means of screw 31 to the extent of the height of the box into which it extends. When this screw is loosened, the strap 30 is free to turn on the screw to be out of the way for positioning the plate 16 and when the plate is in position, the strap may readily be turned to hook over the upper edge of the door and to then be tightened so as to firmly hold the side wing and plate 16 against shifting.

As to the lower member 6 and its ball and socket, the bolt 10 extends downwardly through a horizontally extending lip on the outer end of a member 34 adapted to extend horizontally inwardly across the lower reveal of the window. The inner end of said clamping member has a downwardly extending hook portion 35 that engages the inner side of that portion of the lower window reveal to the outer side of the sliding glass. This hook portion is relatively thin so as to not obstruct the movement of the sliding glass to close the window. Clamping member 34 is centrally provided with an elongated downwardly opening depression therein extending transversely of the window reveal in which depression is a screw 36 rotatably mounted at its outer end in the end wall of the depression and at its opposite inner end extending through and rotatable in an opening in the opposite end wall of said depression. On this screw, with its upper end in the depression is a downwardly extending clamping member 37 curved to generally conform to the cross sectional contour of the window reveal. Upon turning the screw 36 at its inner end, which is slotted for that purpose, the clamping member 37 travels along the screw to securely clamp the lower reveal between said clamp 37 and hook 35. A soft rubber strip 38 is adapted to be positioned on the face of the clamping member 37 that is adjacent the reveal so as to prevent injury to the reveal and to prevent slipping. Also, a rubber strip 39 is provided on the upper strap 30 and against the side of the afore-described box to which the strap is attached for the same purpose.

It will be seen that my device is adapted to be easily and quickly secured to the automobile by means extending into the window opening and to be quickly and easily removed therefrom without marring the car and without drilling holes or the like. When in position on the automobile, leakage over the top or front of the side wing is impossible, since the plate and glass sheet are of the same contour and the rubber strip fits closely against the under side of the plate, said rubber strip joining the reveal at about the termination of the forward end of the plate 16 within the window opening. To facilitate pivoting the side wing so as to allow a draft of air to enter the automobile, if desired, I incline the portion of the plate 16 upwardly as at 40 adjacent edge 22, thus freeing the rubber covered edge of the side wing against unnecessary frictional resistance with the plate.

The ball and socket joints permit ease in installing the side wing, since the outline of the reveal of the window is generally very irregular, not following any common geometric curve. Also, the upper plate must be tilted to enable the edge 22 to be slipped under the upper reveal. The ball and socket joints also enable free pivoting of the side wing irrespective of any possible misalignment or slight variations that might occur in an installation.

The form of upper plate shown in Fig. 7 uses a spring member 41 welded at one end to the plate and extending upwardly therefrom and bowed to conform to the contour of the molding. This is a very effective frictional clamp. A rubber strip 41' is on the side of the spring member to prevent marring of the reveal and to assist in frictionally securing the wing in place.

The form shown in Fig. 8 uses a clamping member 37' similar to that used on the lower clamping member and a screw 36' for moving the clamping member. In this case I may merely weld a member similar to member 34 on the plate, but in inverted position, leaving off the hook 35 and opposite end lip for bolt 10, and cut out the upper plate to permit inward movement of the clamping member 37'. The edge of the plate, indicated at 22'', thus supplants the hook 35 of the lower clamping member. Here also a rubber strip 42 is used on the member 37' to engage the reveal between it and member 37'.

Having described my invention, I claim:

1. In an automobile side wing, a supporting bracket comprising an elongated sheet metal plate bowed longitudinally of its length to follow the outline of an automobile window opening at the curved upper forward corner of the opening, one of the elongated edges of said plate extending divergently rearwardly and outwardly from the forward edge of the window opening and the plate provided with an upstanding flange along its divergently extending edge following the curvature of the plate, a generally vertically extending glass plate below said metal plate and secured thereto, said glass plate formed at its upper edge to follow the curve of the metal plate and means for securing the metal plate to the automobile against movement relative thereto.

2. In an automobile side wing as defined in claim 1, said metal plate being provided along its rear edge with an upstanding flange extending in a direction transversely of the plane of the window opening to deflect rain and the like upwardly upon forward movement of the automobile.

3. In an automobile side wing as defined in claim 1, said metal plate being arranged and adapted to extend transversely across the edge of the window opening along its opposite elongated edge, an upstanding flange formed along the rear edge of the plate extending in a direction transversely of the plane of the window opening to deflect rain and the like upwardly upon forward movement of the automobile, the rear edge of said metal plate terminating rearwardly of the rear edge of the glass plate.

4. In an automobile side wing, a supporting bracket comprising an elongated sheet metal plate bowed longitudinally its length to follow the outline of an automobile window opening at the curved upper forward corner of the opening, one of the elongated edges of said plate extending divergently rearwardly and outwardly from the forward edge of the window opening, said plate provided with an upstanding flange along its divergently extending edge following the curvature of the plate, a generally vertically extending glass plate below said metal plate formed at its upper edge to follow the curve of the plate, means pivotally securing the glass plate to the metal plate, and means for securing the metal plate to the automobile against movement relative thereto.

5. In a construction as defined in claim 4, the means pivotally securing the glass plate to the metal plate comprising a ball and socket joint.

6. In a construction as defined in claim 4, said metal plate being formed with an upstanding flange along its elongated edge opposite said divergently extending edge adapted to engage in a groove formed in the edge of the window opening.

7. In a construction as defined in claim 4, the means for securing the metal plate to the automobile comprising a clamping member adapted to removably clamp the metal plate against the edge of the window opening.

8. An automobile side wing comprising a plate of glass adapted to be disposed vertically with its upper, forward and lower edges including the forward corners thereof generally formed to follow the upper forward and lower edges and forward corners of a window opening in the door of an automobile fitted with sliding glass, means at the upper and lower edges of the plate for mounting said plate on the door in a generally vertically extending position across the forward portion of the door window opening with the upper and lower edges of the glass plate extending divergently rearwardly and outwardly of the door from the forward edge of the window opening, said means including a flat generally horizontally extending sheet metal plate disposed over the upper edge of the glass plate and bowed to conform to the outline of the glass plate at its forward upper corner, one edge of said metal plate being provided with an upstanding flange adapted to fit into the portion of the door in which the glass thereof is adapted to slide and to follow the outline of the window opening at its upper forward corner.

9. In a side wing as defined in claim 8, said sheet metal plate terminating at one end adjacent the rear edge of said plate of glass and provided along said end with an upstanding flange extending in a direction transversely of the plane of the window opening to divert falling rain upwardly above the window opening.

10. The combination of an automobile side wing having a curved upper front corner; of means to support said wing including a metallic plate extending along the top of the wing from a point to the rear of its rear end edge forwardly and having its forward portion curved downwardly and fitting closely at its front end on the curved portion of the wing, said plate being divergingly tapered from front to rear and extending laterally on both sides of the wing, and means to connect the wing pivotally to the plate, to permit longitudinal tilting movement of the plate with respect to the wing whereby the front edge of the plate may be adjusted to fit closely on the wing.

11. In a side wing for an automobile window opening fitted with sliding glass, the combination of an automobile side wing having a curved upper front corner; of means to support said wing including a metal plate extending along the top of the wing from a point adjacent its rear end edge forwardly and having its forward portion curved downwardly and fitting relatively closely at its front end on said curved portion; said plate being divergently tapered from front to rear and extending laterally over the edge of the window opening to the outer side of the sliding glass along one of its divergently extending edges and over the edge of said side wing along its opposite divergently extending edge, means at the upper edge of the side wing spaced from the rear end edge thereof pivotally securing the side wing to the metal plate, separate means adjacent the first mentioned divergently extending edge for securing the plate tightly against the edge of the window opening and means on the metal plate at the inner edge thereof adapted to engage against the inner side of that portion of the automobile window opening to the outer side of the sliding glass.

12. The combination of an automobile side wing having a curved upper front corner; of means to support said wing including a metallic plate extending along the top of the wing from a point adjacent its rear end edge forwardly and having its forward portion curved downwardly and fitting closely at its front end on the curved portion of the wing, said plate being divergingly tapered from front to rear and extending laterally over the edge of the wing along one of the divergingly extending edges, means to connect the wing pivotally to the plate, and other means on said plate to secure the plate to the wall of an automobile body at the top of an opening therein, said last means being arranged to thus secure the plate with its inner side edge projecting below said wall at the top of said opening.

13. The combination of an automobile side wing having a curved upper front corner; of means to support said wing including a metallic plate extending along the top of the wing from a point to the rear of its rear end edge forwardly and having its forward portion curved downwardly and fitting closely at its front end on the curved portion of the wing, said plate being divergingly tapered from front to rear and extending laterally on both sides of the wing, means to connect the wing pivotally to the plate, to permit longitudinal tilting movement of the plate with respect to the wing whereby the front edge of the plate may be adjusted to fit closely on the wing, and other means on said plate to secure the plate to the wall of an automobile body at the top of an opening therein, said last means being arranged to thus secure the plate with its inner edge projecting below said wall at the top of said opening.

14. An automobile side wing for automobile windows having a steeply inclined forward edge and fitted with sliding glass comprising a generally vertically disposed glass plate formed with a forward edge adapted to conform to the outline of the forward edge of the window opening and adapted to be positioned generally vertically across the forward portion of the window opening with the forward edge of the glass positioned adjacent the forward edge of the window opening and extending divergently rearwardly therefrom and outwardly relative to the outer side of the door, a flat sheet metal plate extending across the space between the upper end of said glass plate and the automobile door, and a portion of said metal plate being disposed between the edge of the window opening and the edge of the glass plate in the plane of the window opening, means for securing said sheet metal plate to the automobile and means for securing the glass plate to the metal plate, said sheet metal plate being adapted to extend along one edge transversely across the edge of the window opening to the outer side of the sliding glass, and the opposite edge thereof extending divergently rearwardly and outwardly relative to the door and provided with an upstanding flange along its divergently extending edge, said flange continuing downwardly along the portion of the metal plate adapted to be between the forward edge of the window opening and the forward edge of the metal plate.

JAMES P. CALLAHAN.